United States Patent
Janssen

(10) Patent No.: US 7,474,744 B2
(45) Date of Patent: Jan. 6, 2009

(54) SYSTEM AND METHOD FOR PROVIDING A LOCAL TIME OF FAR END ON TELEPHONE SYSTEMS

(75) Inventor: Holger Janssen, Richmond (CA)

(73) Assignee: VTech Telecommunications Limited, Hong Kong (CN)

( * ) Notice: Subject to any disclaimer, the term of this patent is extended or adjusted under 35 U.S.C. 154(b) by 845 days.

(21) Appl. No.: 10/771,326

(22) Filed: Feb. 5, 2004

(65) Prior Publication Data

US 2005/0175172 A1   Aug. 11, 2005

(51) Int. Cl.
*H04M 3/42* (2006.01)
(52) U.S. Cl. ............... 379/201.07; 379/201.08; 379/201.01; 455/566; 455/564
(58) Field of Classification Search ............ 379/210.07, 379/201.08; 455/566, 564
See application file for complete search history.

(56) References Cited

U.S. PATENT DOCUMENTS

| | | | |
|---|---|---|---|
| 5,818,920 A | | 10/1998 | Rignell et al. |
| 6,075,992 A | | 6/2000 | Moon et al. |
| 6,292,743 B1 | * | 9/2001 | Pu et al. .................... 701/202 |
| 6,751,483 B1 | * | 6/2004 | Oh .............................. 455/566 |
| 6,934,543 B2 | * | 8/2005 | Wang et al. ................. 455/433 |

FOREIGN PATENT DOCUMENTS

| | | |
|---|---|---|
| EP | 1 209 929 A2 | 5/2002 |
| GB | 2 284 965 A | 6/1995 |
| JP | 2001-197169 | 7/2001 |
| WO | WO 97/11413 | 3/1997 |
| WO | WO 02/023935 A3 | 3/2002 |

OTHER PUBLICATIONS

GB Search Report dated Jun. 9, 2005.

* cited by examiner

*Primary Examiner*—Quynh H Nguyen
(74) *Attorney, Agent, or Firm*—Paul, Hastings, Janofsky & Walker LLP

(57) ABSTRACT

The present invention provides a system and method for providing local time of a potential called party to a user of a telephone system (i.e., calling party). In the preferred embodiment, the local time of the potential called party is displayed on a display or announced by a speaker of the telephone system when the name or the telephone number of the potential called party is selected. The local time of the potential called party is provided prior to or while initiating a call so that the user of the telephone system can determine whether it is appropriate time to call the potential called party.

19 Claims, 5 Drawing Sheets

SYSTEM AND METHOD FOR PROVIDING A LOCAL TIME OF FAR END ON TELEPHONE SYSTEMS

BACKGROUND

1. Field of the Invention

The present invention relates generally to telephone systems and, more particularly, to a telephone system for providing local time of a potential called party prior to initiating a call.

2. Background of the Invention

When placing a telephone call to a person (the called party) located in a time zone that is different from that associated with the person placing the call (the calling party), it is courteous to know current local time of the called party (i.e., local time of far end) and whether it is appropriate time to call the person, before placing the call. Otherwise, it can cause inconvenience to the called party. For example, the time difference between New York and Japan is 14 hours. If the calling party in New York calls, at 11 a.m., the called party in Japan would receive the call at 1 a.m. Unless the call was expected by the called party, the calling party might well have caused significant inconvenience to the called party.

It is not always easy to determine local time of far end. For example, the user of a telephone might not know the time difference between a local time of the user and the local time of far end, thus unable to determine the local time of the person. Even if the user is aware of the time difference, it is often cumbersome to determine the local time of far end.

There are devices, such as digital watches, hand-held devices, or computers, that display current time for multiple time zones or local time of various locations. Also, some offices, banks or hotels provide multiple clocks to display times of other time zones. Some telephone users might be able to rely on these devices to determine local time of far end prior to initiating a call. However, most users do not have an access to such devices all the time. It is likely that most users do not have access to such devices or displays when they wish to place a call.

Thus, there is a desire for a convenient way for a telephone user to be able to determine, prior to initiating the call, local time at the far end whenever the user wishes to place a call.

BRIEF SUMMARY OF THE INVENTION

The present invention provides a system and method for providing local time of a potential called party (i.e., local time at far end). The local time of the potential called party is provided prior to or while initiating a call so that the user of a telephone system, the calling party, can determine whether it is appropriate time to call the potential called party. The present invention integrates local time information into a telephone system. The present invention automatically displays or announces a local time of the potential called party when an entry that matches an entry in a phonebook of a telephone system is selected.

In a preferred embodiment of the present invention, telephone system for providing local time of a potential called party to a user of the telephone system includes a keypad, a memory, a processor, a display, and a speaker. The keypad receives input from the user of the telephone system. The processor processes the input and displays output on the display and/or announces the output via the speaker. The memory allows the user to save names and associated telephone numbers in a "phonebook."

When the user selects a potential called party from the phonebook, the processor retrieves an entry associated with the selected potential called party from the phonebook. The processor then computes local time of the selected potential called party and provides the local time of the selected potential called party to the user prior to the user initiates the call. The local time of the selected potential called party may be displayed on the display or announced via the speaker.

The present invention may be used with any form of dialing. The present invention may be used with, for example, pre-dialing which a user enters a telephone number before going off-hook, re-dialing which calls the last called number, caller identification (CID) dialing (calling a number stored in the CID log) or other dialing using call logs, such as incoming call logs, outgoing call loges, and missed call logs.

The present invention eliminates the need to consult an external device, such as a computer or a digital watch that displays current times for multiple time zones to determine local time at far end. In the present invention, the local time of far end is available whenever an entry from a phonebook of the invention is accessed.

DETAILED DESCRIPTION OF THE INVENTION

Reference will now be made in detail to the exemplary embodiments of the present invention, examples of which are illustrated in the accompanying drawings.

Figure 1:
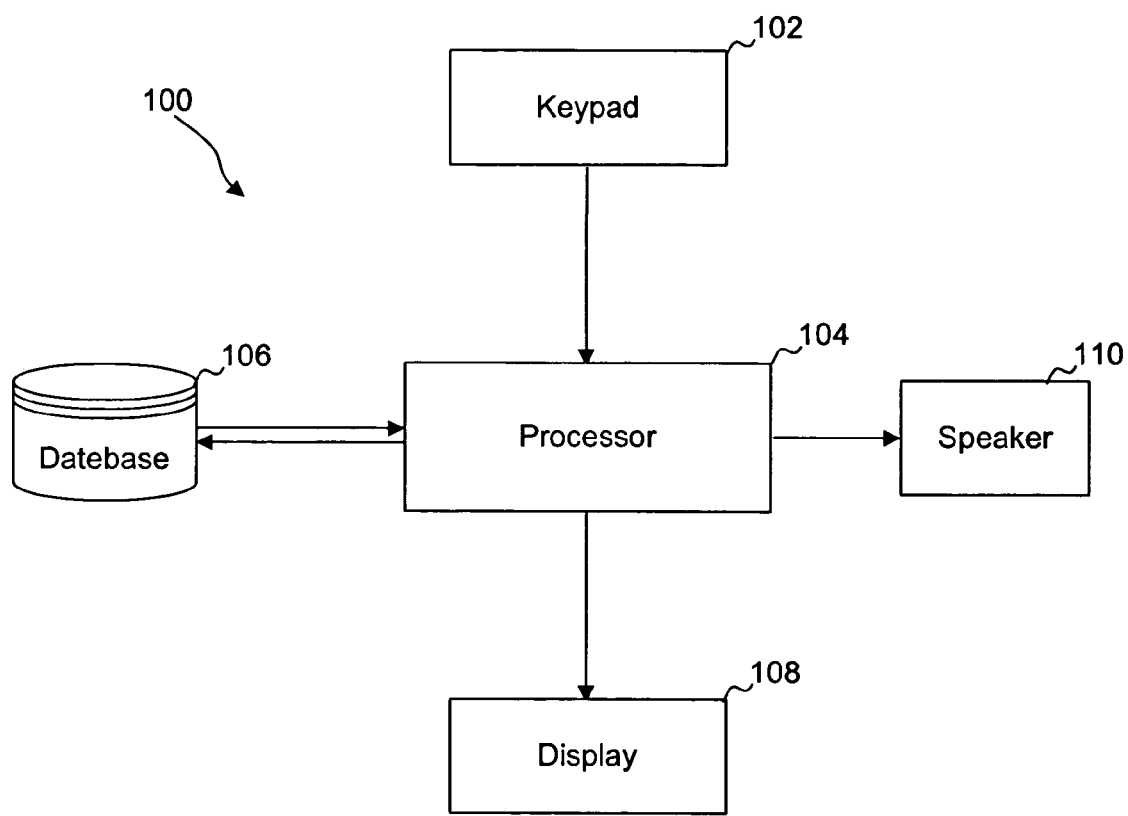
FIG. 1 is a block diagram of components of a telephone system according to a preferred embodiment of the present invention.

FIG. 1 is a schematic diagram showing main components of an exemplary telephone system according to a preferred embodiment of the present invention. Telephone system 100 may be a cellular telephone, a cordless telephone, a corded telephone, or combination thereof. Telephone system 100 includes keypad 102, processor 104, memory 106, display 108, and speaker/receiver 110. Keypad 102 receives input from a user of telephone system 100. Processor 104 processes the input and displays output on display 108 and/or announces the output via speaker 110. Display 108 may be a liquid crystal display (LCD). In the context of a cordless telephone, telephone system 100 may include one or more handsets and a base unit. Each of the handset and the base unit may include memory 106.

Memory 106 allows the user to save names and associated telephone numbers in a "phonebook." Processor 104 can be used to output one or more entries of the phonebook on display 108 or speaker 110. Using the phonebook, the user can simply select a person (potential called party) the user wishes to call without memorizing a telephone number of the person or inputting the telephone number each time the user wishes to call the person. The user can modify the phonebook using keypad 102.

To create an exemplary phonebook of the invention, the user inputs a name and a telephone number of each potential called party. The user also inputs, for each potential called party, a time difference between local time of the user (i.e., local time of near end or calling party time) and local time of the potential called party (i.e., local time of far end or called party time). Each entry of the phonebook, according to the preferred embodiment of the invention, includes a name, a telephone number and a time difference associated with a potential called party. The time difference may be any number ranging between about −23.5 hours and about +23.5 hours. The default value is 0. The local time of the user can be obtained from various sources. For example, the local time of the user is typically available on many telephones, including integrated telephone answering device (ITAD) enabled telephones. The local time of the user can be either initialized by the user and/or derived from CID information.

Figure 2:
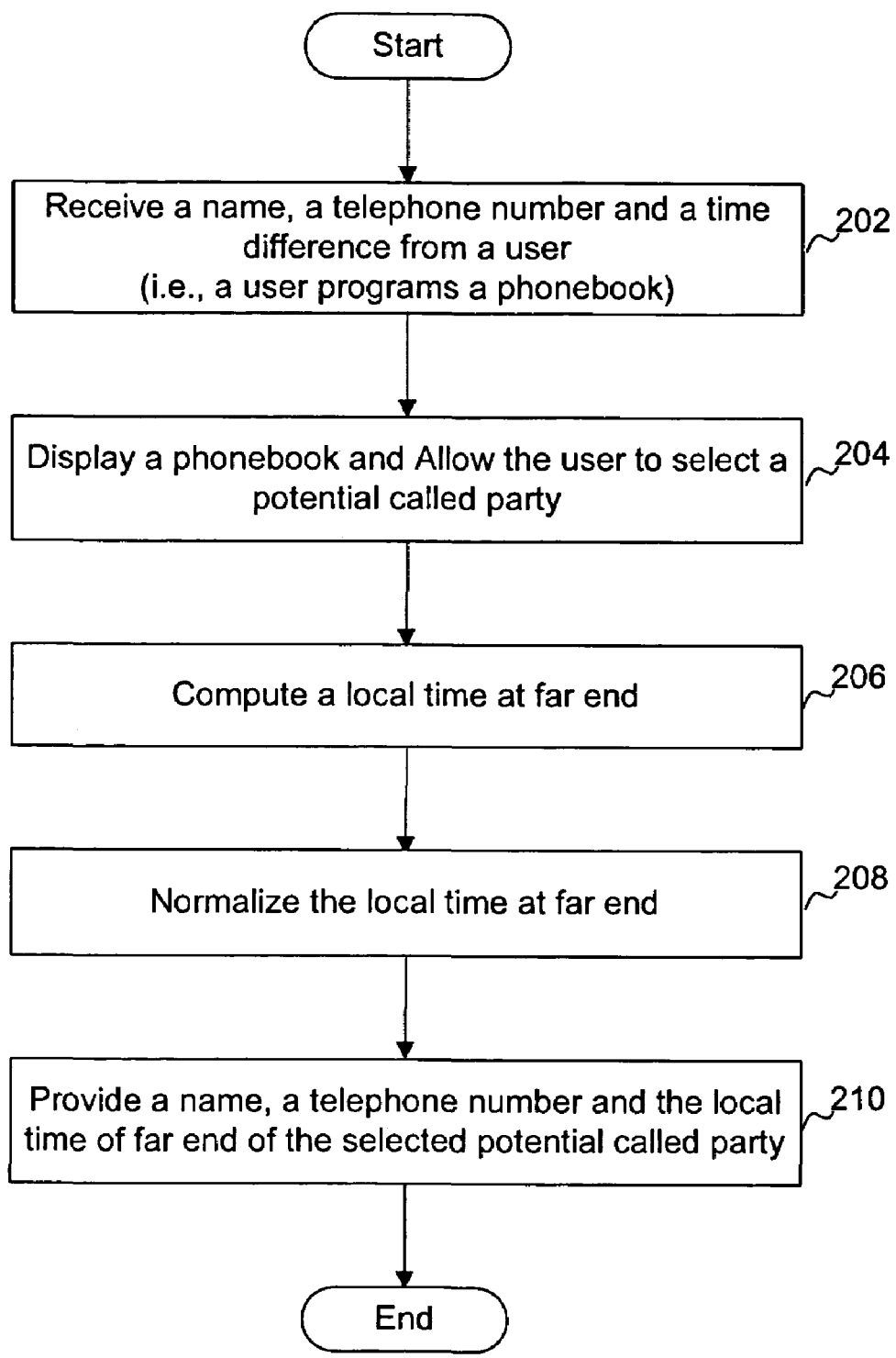
FIG. 2 is a flowchart illustrating an exemplary process associated with a preferred embodiment of the present invention.

FIG. 2 is a flowchart illustrating an exemplary process associated with a preferred embodiment of the present invention.

At step 202, a phonebook of a telephone (e.g., telephone system 100) is programmed. That is, for each of one or more entries in the phonebook of the telephone, the user inputs a name and a telephone number of each potential called party and a time difference between local time of the user and local time of the potential called party. For example, for a first potential called party located in Tokyo, Japan, a user in New York, U.S.A. may enter a name, a telephone number and "+14" to an entry associated with the first potential called party. For a second potential called party located in Vancouver, Canada, the user may enter another name, another telephone number and "−3" to the second entry associated with the second potential called party. After the name, the telephone number and the time difference for each potential called party are entered in the phonebook, the user saves and exits the phonebook. The name, the telephone number and the time difference are thus saved in memory 106.

At step 204, when the user is ready to make a telephone call to a potential called party listed in the phonebook, the user selects an option to review the phonebook using keypad 102. In response to the user's selection, processor 104 retrieves the phonebook from memory 106, and displays names and/or telephone numbers on display 108. The user then selects a potential called party the user wishes to call. For example, the user in New York may select either the first potential called party (located in Tokyo) or the second potential called party (located in Vancouver).

At step 206, processor 104 retrieves the entry associated with the selected potential called party and computes the local time at far end. The local time at far end is computed by adding the time difference associated with the potential called party in the retrieved entry to the current local time of the user. For example, if the local time of the user in New York at that time is 11:30 a.m. and the selected potential called party is located in Tokyo, Japan, then processor 104 would add 14 hours to the local time of the user, resulting the local time at far end to be 1:30 a.m. of the next day. On the other hand, if a potential called party is located in Vancouver, Canada, then processor 104 would subtract 3 hours from 11:30 a.m., resulting the local time at far end to be 8:30 a.m. of the same day.

At step 208, processor 104 may normalize the local time at far end in one of known digital time formats. For example, the Tokyo time associated with the first potential called party would be formatted as, for example, 01:30 or 11:30 a.m.

At step 210, processor 104 provides the name and/or the telephone number and the local time at far end of the selected potential called party to the user. Processor 104 may display the information on display 108. For example, a menu may be presented to the user. Display 108 may display the name, the telephone number and the local time of the far end. The menu may further prompt or solicit whether the user wishes to initiate the call. For example, display 108 may display: "Called Party Time is 1:30 am, Call?" If speaker 110 is used, an announcement may be played by processor 104 to asked the user: "The local time of the called party is 1:30 am, say YES or press the ON button if you wish to make the call." Alternatively, processor 104 may also announce the information using speaker 110.

The user then verifies and confirms that the user wishes to place a call to the selected potential called party and determines whether it is appropriate time to call, prior to initiating the call.

In another embodiment, processor 104 may display the local time at far end while the user is browsing the phonebook (e.g., address book). The local time at far end may be displayed in analog representation. The local time at far end can also be displayed as a graphic in nature (for example, displaying the local time at far end on a world map). In addition to displaying the local time at far end, the world map may be shaded to represent day and night.

For summer and winter time, also known as Daylight Saving Time and Daylight Standard Time, respectively, telephone system 100 may provide additional programming options. For example, processor 104 can be configured to switch between the "saving" and "standard" times automatically. Alternatively, processor 104 can be configured to allow manual update by the user when it is time to switch from one of the "savings" and "standard" times to the other. Further, telephone system 100 may be configured to account for difference in the date at which the Daylight Saving Time is advanced or retarded. This can be used to account for potential called parties in the southern hemisphere.

In yet another embodiment, processor 104 is configured to compute local time at far end by utilizing an area code and/or a country code of a telephone number. The user inputs a name and a telephone number of a potential called party to create an entry in the phonebook. Processor 104 then automatically computes a time difference by utilizing an area code and/or a country code of the telephone number and provides the time difference as additional input to the entry. In this manner, the user knows the local time at far end without knowing the time difference.

In the embodiment, memory 106 may include a telephone code database and a time zone database, or a combination thereof. The telephone code database may include a list of country codes and area codes and corresponding geographical locations. The time zone database may include a list of the different time zones and their corresponding geographical locations and a list of current local time of each time zone. The time zone database may also include a list of time difference between the current local time of the user and local time of each time zone.

Figure 3:
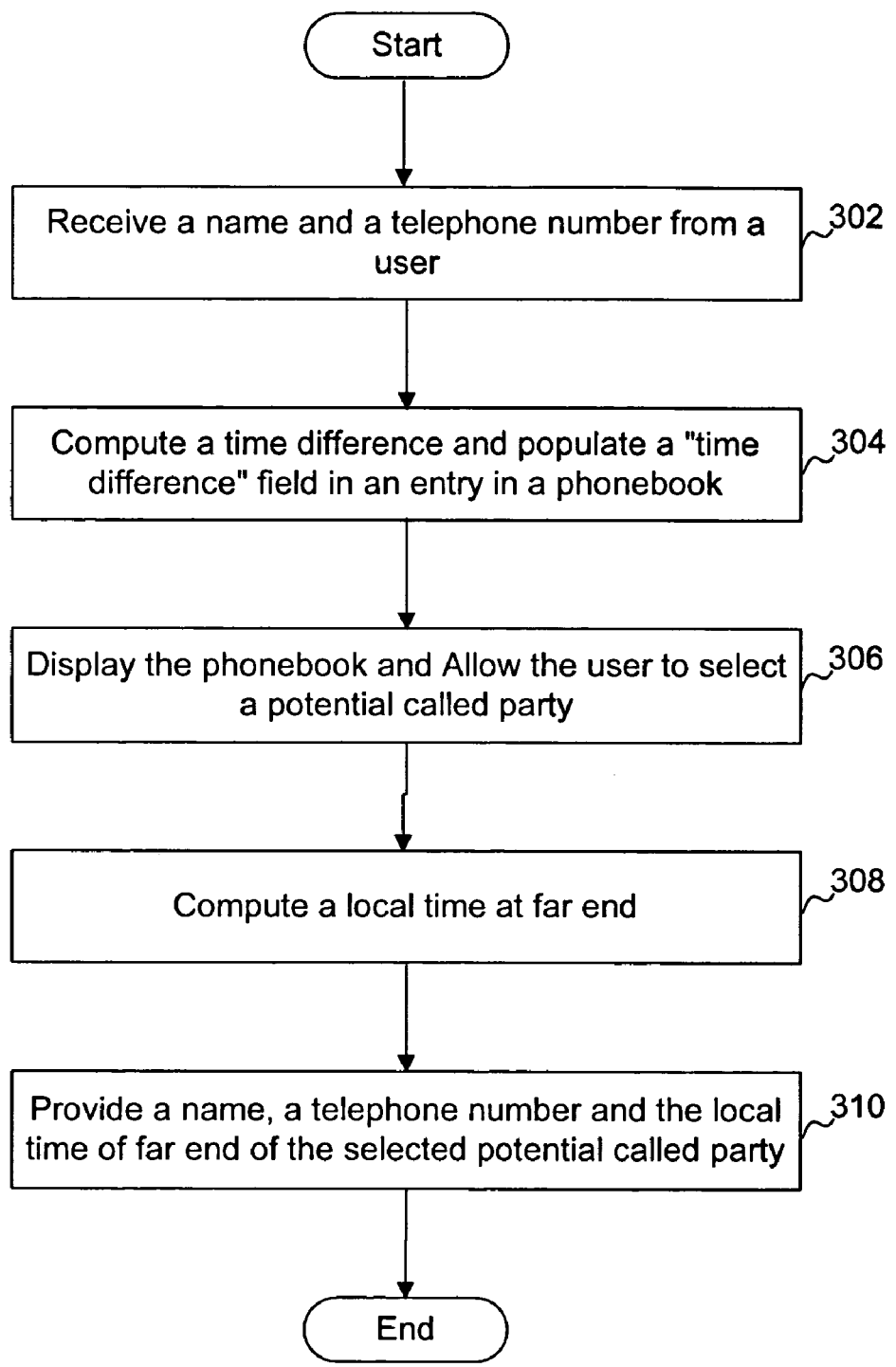
FIG. 3 is a flowchart illustrating an exemplary process associated with another preferred embodiment of the present invention.

FIG. 3 is a flowchart illustrating an exemplary process associated with using another preferred embodiment of the present invention.

At step 302, for each of one or more entries in a phonebook of a telephone, the user inputs a name and a telephone number of each potential called party.

At step 304, for each entry, processor 104 utilizes the telephone code database and the time zone database in memory 106 to compute a time difference and populate a "time difference" field associated with the entry. In other words, based on the country code and/or area code of the telephone number inputted by the user, processor 104 computes the appropriate time difference for the entry in the phonebook. For example, processor 104 compares the area code and/or the country code of the telephone number to the list in the telephone code database to compute a geographical location associated with the telephone number. Processor 104 then compares the geographical location associated with the telephone number to the lists in the time zone database, thus computing the appropriate time difference. After the time difference is computed and populated in the phonebook, the user saves and exits the phonebook. The name, the telephone number and the time difference are thus saved in memory 106.

At step 306, when the user is ready to make a telephone call to a potential called party listed in the phonebook, the user selects an option to review the phone book. In response to the user's selection, processor 104 retrieves the phonebook from memory 106 and displays names and/or telephone number on display 108. The user then selects a potential called party the user wishes to call.

At step 308, processor 104 retrieves the entry associated with the selected potential called party and computes the local time at far end. The local time at far end is computed by adding the time difference in the retrieved entry to the current local time of the user.

At step 310, processor 104 provides the name and/or the telephone number and the local time at far end of the selected potential called party to the user. Processor 104 may display the information on display 108. Alternatively, processor 104 may announce the information using speaker 110.

The user then verifies and confirms that the user wishes to place a call to the selected potential called party and determines whether it is appropriate time to call, prior to initiating the call.

In another embodiment, the telephone code database and the time zone database may be external databases. Processor 104 may utilizes the external databases to compute a time difference and populate a "time difference" field associated with each entry in the phonebook. The external databases may be accessed via, for example, a dial up number or WWW (World Wide Web) site.

In yet another embodiment, processor 104 is configured to compute local time at far end by utilizing an area code and/or a country code of a telephone number after a potential called party is selected. The user inputs a name and a telephone number of a potential called party to create an entry in the phonebook. After a potential called party is selected, processor 104 automatically computes a time difference by utilizing an area code and/or a country code of the telephone. In this manner, the user knows the local time at far end without knowing the time difference and a larger number of the phonebook entries can be saved in the memory.

Figure 4:
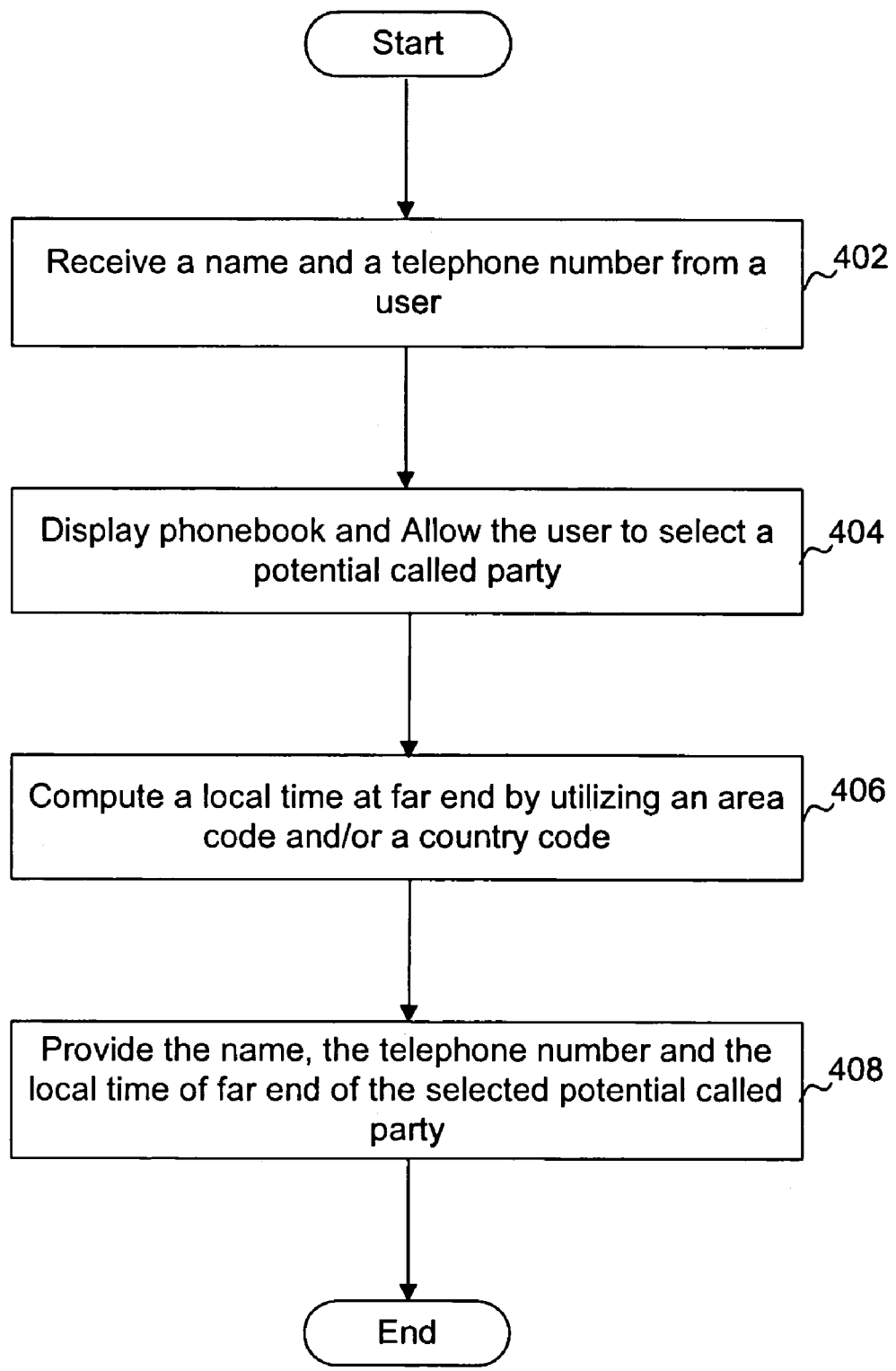
FIG. 4 is a flowchart illustrating an exemplary process associated with yet another preferred embodiment of the present invention.

FIG. 4 is a flowchart illustrating an exemplary process associated with yet another preferred embodiment of the present invention.

At step 402, for each of one or more entries in a phonebook of a telephone, the user inputs a name and a telephone number of each potential called party. After the name and the telephone number for each potential called party are entered in the phonebook, the user saves and exits the phonebook. The name and the telephone number are thus stored in memory 106.

At step 404, when the user is ready to make a telephone call to a potential called party listed in the phonebook, the user selects an option to review the phonebook. In response to the user's selection, processor 104 retrieves the phonebook from memory 106 and displays names and/or telephone number on display 108. The user then selects a potential called party the user wishes to call.

At step 406, processor 104 retrieves an entry associated with the selected potential called party. Processor 104 then computes the local time at far end of the selected potential called party by utilizing an area code and/or a country code of the telephone number associated with the potential called party. Processor 104 may compare the area code and/or the country code of the telephone number to the lists in the telephone code database and the time zone database in memory 106. Processor 104 may compute a time difference first. Processor 104 then computes the local time at far end of the selected potential called party by using the time difference.

At step 408, processor 104 provides the name and/or the telephone number and the local time at far end of the selected potential called party to the user. Processor 104 may display the information on display 108. Alternatively, processor 104 may announce the information using speaker 110.

The user then verifies and confirms that the user wishes to place a call to the selected potential called party and determines whether it is appropriate time to call, prior to initiating the call.

Figure 5:
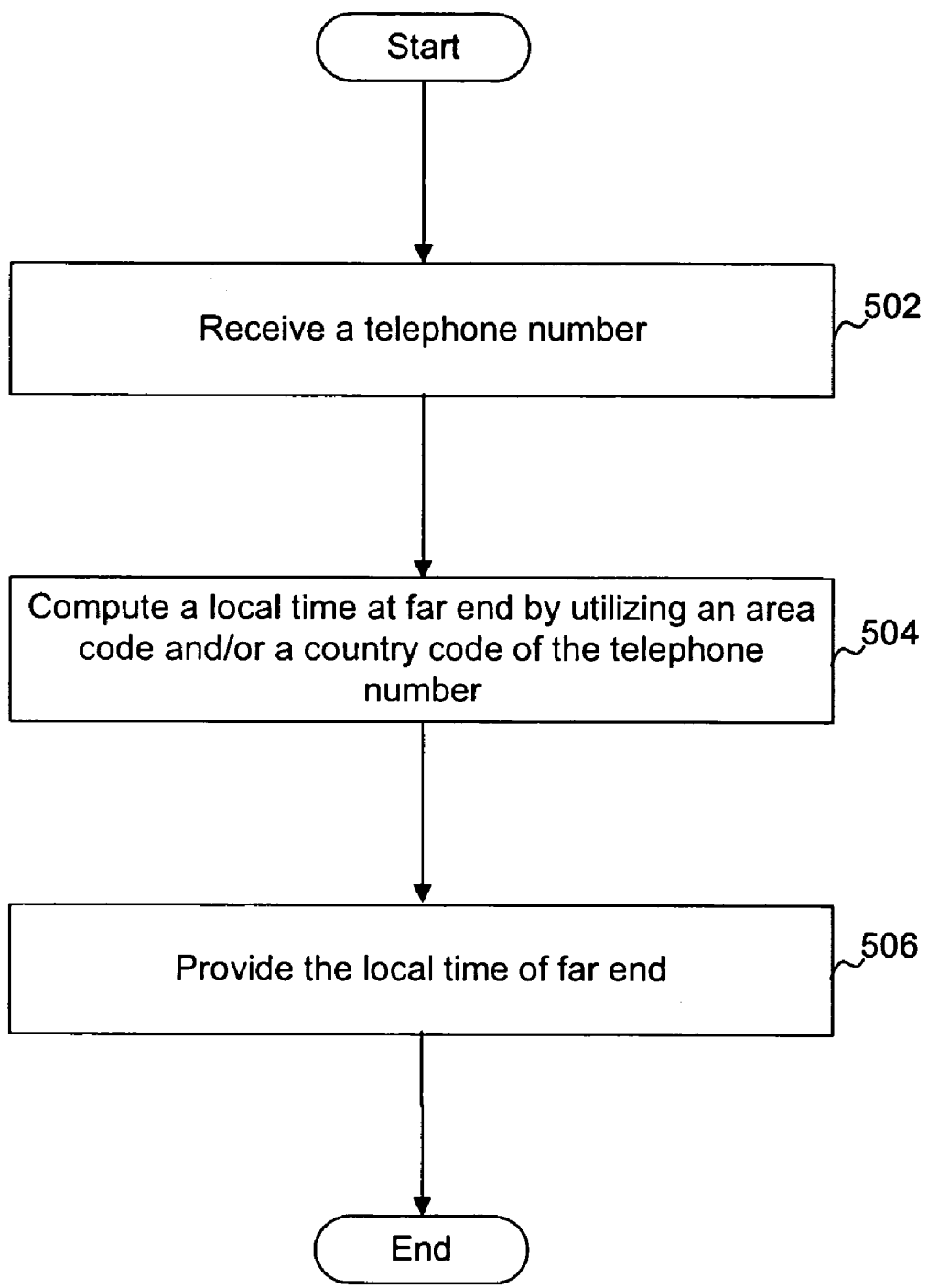
FIG. 5 is a flowchart illustrating an exemplary process associated with yet another preferred embodiment of the present invention.

The present invention is not limited to utilizing the telephone numbers in the phonebook. The present invention may be used with any form of dialing. The present invention may be used with, for example, pre-dialing (a user enters a telephone number before going off-hook), re-dialing (calling the last called number), CID dialing (calling a number stored in the CID log) or other dialing using call logs, such as incoming call logs, outgoing call loges, and missed call logs. For example, as shown in FIG. 5, a processor of a telephone system receives a telephone number (i.e., called party's telephone number) from, for example, pre-dialing, re-dialing, or CID dialing, at step 502. At step 504, the processor computes local time at far end by utilizing an area cod and/or a county code of the telephone number. At step 506, the processor provides the local time at far end to the user. The processor may display or announce the information. Further, during live dialing, the local time at far end may be displayed as soon as the relevant digits (i.e., country code and/or area code) have been entered.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A telephone system for providing local time of a potential called party to a user of the telephone system comprising:
 a memory for storing in advance of attempting to dial the potential called party at least one entry associated with the potential called party, each at least one entry including a time difference between the local time of the potential called party and local time of the user;
 a processor configured to compute local time of the potential called party,
 wherein the processor accounts for switching between daylight saving time and daylight standard time; and
 a display in communication with the processor, wherein the display displays phonebook information that lists the potential called party and wherein the display displays the local time of the potential called party while the user is browsing the phonebook information.

2. The system of claim 1, further comprising a speaker that announces the local time of the potential called party.

3. The system of claim 1, wherein the display outputs the local time of the potential called party prior to when the user initiates a call to the potential called party.

4. The system of claim 1, wherein the memory includes a plurality of entries, wherein at least one of the entries includes a telephone number and a name associated with the potential called party.

5. The system of claim 1, wherein the processor computes the local time of the potential called party by adding the time difference to the local time of the user.

6. The system of claim 1, wherein the processor computes the local time of the potential called party by utilizing an area code and/or a country code of a telephone number associated with the potential called party.

7. The system of claim 1, wherein the processor receives a telephone number associated with the potential called party from one of re-dialing, CID dialing, dialing from an incoming call log, dialing from an outgoing call log, and dialing from a missed call log, and wherein the processor computes the local time of the potential called party based on the received telephone number.

8. A method for providing local time of a potential called party to a user of a telephone system, comprising:
 retrieving an entry associated with a potential called party selected by the user from a plurality of entries of a phonebook of the telephone system, one or more of the entries including a time difference between local time of the user and the local time of the potential called party;
 computing local time of the potential called party, wherein computing local time of the potential called party includes accounting for switching between daylight saving time and daylight standard time; and
 providing the local time of the potential called party to the user, wherein the local time of the potential called party is displayed to the user while the user is browsing the phonebook.

9. The method of claim 8, wherein each of the plurality of entries includes a name and telephone.

10. The method of claim 9, wherein computing the local time of the potential called party comprises adding the time difference to local time of the user.

11. The method of claim 8, wherein each of the plurality of entries includes a telephone number, and wherein computing the local time of the potential called party utilizes at least one of an area code and a country code of the telephone number.

12. The method of claim 11, wherein computing local time of the potential called party further includes utilizing an internal database.

13. The method of claim 11, wherein computing local time of the potential called party further includes utilizing an external database.

14. The method of claim 8, further comprising determining the time difference between the local time of the potential called party and local time of the user.

15. The method of claim 14, wherein the time difference is computed and stored before the entry associated with the potential called party is selected.

16. The method of claim 14, wherein the local time of the potential called party is computed immediately after the user has pre-selected the phone number of the potential called party.

17. The method of claim 8, wherein the local time of the potential called party is announced.

18. A method for providing local times of potential called parties, comprising:
 displaying phonebook information of a phonebook of a telephone system to a user, wherein the phonebook information includes a browsable list of items, in which each item contains one or more of a name and telephone number associated with a respective potential called party, wherein the phonebook further includes a time difference between a local time of the user and a local time of the respective potential called party for at least one item of the browsable list of items;
 allowing the user to select the at least one item of the browsable list of items;
 retrieving the time difference associated with the selected item from the phonebook;
 determining local time of the telephone system;
 computing local time of the selected potential called party by adding the retrieved time difference to the local time of the telephone system, wherein computing local time of the potential called party includes accounting for switching between daylight saving time and daylight standard time; and
 displaying the local time of the selected potential called party to the user while the user is browsing the browsable list of items.

19. The method of claim 18, wherein the local time of the selected potential called party is announced.

* * * * *